3,825,600
PROCESS FOR THE PREPARATION OF UNSATU-
RATED CARBONYL COMPOUNDS
Takashi Ohara and Michio Ueshima, Nishinomiya, and
Isao Yanagisawa, Ikeda, Osaka, Japan, assignors to
Nippon Shokubai Kagaku Kogyo Co., Ltd., Osaka,
Japan
No Drawing. Filed May 25, 1971, Ser. No. 146,848
Int. Cl. C07c 45/02
U.S. Cl. 260—604 R    4 Claims

ABSTRACT OF THE DISCLOSURE

A process for the preparation of unsaturated carbonyl compounds which comprises catalytically by oxidizing an olefin selected from the group consisting of propylene and isobutylene in the vapor phase in the presence of catalytic oxide in which the atomic ratio among the constituent metallic elements, Co:Fe:Bi:W:Mo:Si:Z is within the range of 2.0–20.0:0.1–10.0:0.1–10.0:5–10.0:2.0–11.5:0.5–15.0:0.005–1.0, with the proviso that W plus Mo equals 12.0, and Z stands for an alkali metal.

---

This invention relates to a process for the preparation of unsaturated carbonyl compounds from olefins. More particularly, the invention relates to a catalytic vapor phase oxidation of propylene or isobutylene to make the corresponding unsaturated carbonyl compound, i.e., acrolein or methacrolein respectively.

In the industrial scale production of unsaturated carbonyl compounds by the catalytic vapor phase oxidation of the corresponding olefins, it is generally true that the use of a catalyst which gives high conversion of olefins and shows high selectivity for the desired unsaturated carbonyl compound is particularly important.

As the catalyst conventionally employed in the preparation of acrolein or methacrolein by the catalytic vapor phase oxidation of propylene or isobutylene, respectively, catalytic oxides composed of molybdenum, tellurium, cadmium or zinc, and oxygen are recommended, for example, by the prior art disclosed in Japanese Official Patent Gazette, Publication No. 10605/68. Also the same Gazette, Publication No. 6245/69 teaches the use of a catalytic oxide composed of nickel, cobalt, iron, bismuth, molybdenum, phosphorus and oxygen. However, the per-pass yield of the unsaturated carbonyl compound obtained through the action of those known catalysts is industrially unsatisfactory.

Accordingly, the object of the invention is to provide a process for making unsaturated carbonyl compounds with industrial advantages, which employs a novel catalyst system.

It has been discovered that the above object of the invention can be accomplished by the use of a catalytic oxide which comprises cobalt, iron, bismuth, tungsten, molybdenum, silicon, an alkali metal and oxygen, since in the presence of such catalyst acrolein or methacrolein is obtained from propylene or isobutylene, respectively, with very high per-pass yield.

The catalyst or catalytic oxide of the invention is characterized in that the metallic elements constituting the same are present in the following atomic ratios:

Co:Fe:Bi:W:Mo:Si:Z=2.0–20.0:0.1–10.0:0.1–10.0:0.5–10.0:2.0–11.5:0.5–15.0:0.005–1.0

(provided that W+Mo=12.0, and Z stands for an alkali metal, i.e., Li, Na, K, Rb or Cs). Presumably, the oxygen is present in the catalyst in the form of complex metal oxide or metallic acid salt. Consequently, the oxygen content of the catalyst varies depending on the atomic ratios of the metallic elements constituting the catalyst.

The catalyst of the invention can be prepared through the steps of, for example, mixing an aqueous solution of ammonium molybdate and ammonium p-tungstate, adding to the mixture aqueous solutions of cobalt nitrate, iron nitrate, and bismuth nitrate, further adding thereto an aqueous solution of a hydroxide or carbonate of an alkali metal and subsequently colloidal silica as the silicon source, concentrating the system by evaporation, molding the resulting clay-like substance and calcining the same at temperatures between 350–600° C., in an air current. Obviously, the starting materials of the catalyst are not limited to the ammonium salt, nitrate, hydroxide and carbonate as above, but other various compounds are equally useful as long as they can form the catalytic oxide upon calcination.

As the carrier, for example, silica gel, alumina, silicon carbide, diatomaceous earth, titanium oxide and "Celite," etc. may be employed, particularly preferred carriers being silica gel, titanium oxide and "Celite."

The catalytic vapor phase oxidation in accordance with the invention is performed by introducing a gaseous mixture composed of 1–10 vol. percent of propylene or isobutylene, 5–15 vol. percent of molecular oxygen, 20–60 vol. percent of steam and 20–50 vol. percent of an inert gas, onto the catalyst prepared as above, at temperatures ranging from 250–450° C. and pressures ranging from the normal pressure to 10 atmospheres. Suitable contact time ranges from 1.0 to 10.0 seconds. The reaction can be carried out either with a fixed bed or fluidized bed. Through the above-specified operation, results such as 92–100 mol percent conversion of propylene or isobutylene, 90–93 mol percent selectivity for acrolein and 80–87 mol percent selectivity for methacrolein can be obtained. Such results are markedly superior to those of the prior art.

Although the subject invention is not tied by the basic concept, the excellent results of the subject process are presumably due to the appropriate adjustment of catalytic ability accomplished by the concurrent presence, in the catalytic oxide of the invention, of molybdate and tungstate of cobalt, iron, and bismuth, with oxides; presence of heteropolyacid compound containing silicon and alkali metal; etc. This presumption is substantiated by the facts that the selectivities are markedly improved by the presence of alkali metal, and that the conversion is improved by the presence of silicon, while retaining the high level of selectivities, as demonstrated in the later appearing Example 1 and Controls 1 and 2.

The terms, conversion, selectivity, and per-pass yield, are used in this specification with the definitions below.

Conversion (percent)

$$= \frac{\text{Mol number of reacted olefin}}{\text{Mol number of supplied olefin}} \times 100$$

Selectivity (percent)

$$= \frac{\text{Mol number of formed unsaturated carbonyl compound}}{\text{Mol number of reacted olefin}} \times 100$$

Per-pass yield (percent)

$$= \frac{\text{Mol number of formed unsaturated carbonyl compound}}{\text{Mol number of supplied olefin}} \times 100$$

Hereinafter the invention will be more fully explained with reference to working examples and controls, it being understood that the scope of this invention is by no means thereby restricted.

EXAMPLE 1

Seventy (70.0) g. of cobalt nitrate were dissolved in 20 ml. of distilled water. Also 24.3 g. of ferric nitrate were dissolved in 20 ml. of distilled water, and 29.2 g. of bismuth nitrate, in 30 ml. of distilled water which was made acidic with 6 ml. of conc. nitric acid. Separately, into 150 ml. of water, 106.2 g. of ammonium molybdate and 32.4 g. of ammonium p-tungstate were dissolved under heating and stirring. The foregoing three aqueous solutions of nitrates were dropped into the aqueous ammonium salts solution, and further an aqueous solution formed by dissolving 0.202 g. of potassium hydroxide in 15 ml. of distilled water and 24.4 g. of 20% silica-sol were added thereto. The suspension was heated under stirring to cause evaporation of the liquid component. The resulting solid was molded and calcined at 450° C. for 6 hours in an air current to form the catalyst. The metallic composition of the catalyst was as below, in terms of atomic ratio:

$$Co_4Fe_1Bi_1W_2Mo_{10}Si_{1.35}K_{0.06}$$

Sixty (60) ml. of the catalyst were packed in a stainless steel U-shaped tube of 20 mm. in diameter. The tube was immersed in a molten nitrate bath heated at 320° C., and through the same tube a gaseous mixture composed of 4 vol. percent of propylene, 51 vol. percent of air and 45 vol. percent of steam was passed to be reacted with the contact time of 2.7 seconds. The results were as shown in Table 1.

Control 1

Example 1 was repeated except that the addition of silica-sol was omitted. The metallic composition of the resulting catalyst was as follows in terms of atomic ratio:

$$Co_4Fe_1Bi_1W_2Mo_{10}K_{0.06}$$

This catalyst was used in the reaction of Example 1, with the results as shown also in Table 1.

Control 2

Example 1 was repeated except that the use of potassium hydroxide was omitted. The metallic composition of the catalyst was as follows, in terms of atomic ratio:

$$Co_4Fe_1Bi_1W_2Mo_{10}Si_{1.35}$$

The catalyst was used in the reaction of Example 1, with the results as given in Table 1.

TABLE 1

| | Composition of catalyst (atomic ratio) | | | | | | | Reaction temperature (° C.) | Propylene conversion (mol percent) | Selectivity (mol percent) | | Per-pass yield (mol percent) | |
|---|---|---|---|---|---|---|---|---|---|---|---|---|---|
| | Co | Fe | Bi | W | Mo | Si | K | | | Acrolein | Acrylic acid | Acrolein | Acrylic acid |
| Example 1 | 4 | 1 | 1 | 2 | 10 | 1.35 | 0.06 | 320 | 97.0 | 93.0 | 6.1 | 90.2 | 6.0 |
| Control 1 | 4 | 1 | 1 | 2 | 10 | | 0.06 | 320 | 86.4 | 92.5 | 4.7 | 79.9 | 4.1 |
| Control 2 | 4 | 1 | 1 | 2 | 10 | 1.35 | | 320 | 94.5 | 71.5 | 11.4 | 67.5 | 10.7 |

EXAMPLES 2–3

The catalyst was prepared in accordance with Example 1. Example 1, using this catalyst, was repeated except that the contact time and the composition of gaseous mixture were changed. The results were as shown in Table 2.

TABLE 2

| | Reaction temperature (° C.) | Contact time (sec.) | Composition of gaseous mixture (mol percent) | | | Propylene conversion (mol percent) | Selectivity (mol percent) | | Per-pass yield (mol percent) | |
|---|---|---|---|---|---|---|---|---|---|---|
| | | | Propylene | Steam | Air | | Acrolein | Acrylic acid | Acrolein | Acrylic acid |
| Example 2 | 325 | 1.8 | 4 | 45 | 50 | 96.5 | 93.0 | 5.5 | 89.7 | 5.3 |
| Example 3 | 325 | 1.8 | 7 | 30 | 63 | 96.0 | 90.0 | 7.1 | 86.4 | 6.8 |

EXAMPLES 4–15

Catalysts of the compositions specified in Table 3 having the ratios of Co:Fe:Bi:W:Mo:S: alkali metal of 3.0–6.0:0.5–2:0.5–1:2–4:8–10:1.35–3:0.02–0.1 were prepared in the manner similar to catalyst preparation in Example 1. Propylene was oxidized in the presence of those catalysts, similarly to Example 1, at the indicated reaction temperatures, with the results as shown in Table 3. Note that in Example 9, 20 wt. percent to the catalyst of silica gel, and in Example 13, 30 wt. percent to the catalyst of titanium oxide, were used as the carriers, respectively.

TABLE 3

| Example No. | Composition of catalyst (atomic ratio) | | | | | | | | | | Reaction temperature (° C.) | Propylene conversion (mol percent) | Selectivity (mol percent) | | Per-pass yield (mol percent) | |
|---|---|---|---|---|---|---|---|---|---|---|---|---|---|---|---|---|
| | Co | Fe | Bi | W | Mo | Si | K | Na | Li | Cs | | | Acrolein | Acrylic acid | Acrolein | Acrylic acid |
| 4 | 3 | 1 | 1 | 2 | 10 | 1.35 | 0.02 | | | | 340 | 95.0 | 90.6 | 7.1 | 86.0 | 6.7 |
| 5 | 6 | 1 | 1 | 2 | 10 | 1.35 | 0.08 | | | | 320 | 96.8 | 90.2 | 5.3 | 87.2 | 5.1 |
| 6 | 4 | 0.5 | 1 | 2 | 10 | 1.5 | 0.06 | | | | 320 | 97.8 | 90.7 | 6.9 | 88.8 | 6.7 |
| 7 | 4 | 2 | 0.5 | 2 | 10 | 2.0 | 0.06 | | | | 320 | 94.0 | 90.8 | 6.0 | 85.4 | 5.6 |
| 8 | 4 | 1 | 1 | 4 | 8 | 3.0 | 0.08 | | | | 350 | 94.8 | 92.6 | 5.2 | 87.8 | 4.9 |
| 9 | 4 | 1 | 1 | 2 | 10 | 1.35 | 0.06 | | | | 320 | 96.8 | 91.7 | 6.6 | 88.7 | 6.4 |
| 10 | 4 | 1 | 1 | 2 | 10 | 1.5 | 0.08 | | | | 330 | 96.5 | 92.4 | 5.8 | 89.2 | 5.6 |
| 11 | 4 | 1 | 1 | 2 | 10 | 1.35 | | 0.02 | | | 320 | 96.2 | 90.5 | 6.9 | 87.1 | 6.6 |
| 12 | 4 | 1 | 1 | 3 | 9 | 1.35 | | 0.1 | | | 320 | 94.8 | 92.2 | 5.4 | 87.3 | 5.1 |
| 13 | 4 | 1 | 1 | 2 | 10 | 1.35 | | | 0.02 | | 340 | 95.5 | 90.8 | 6.2 | 86.7 | 5.9 |
| 14 | 4 | 1 | 1 | 2 | 10 | 1.35 | | | | 0.02 | 350 | 96.5 | 91.1 | 6.4 | 87.9 | 6.2 |
| 15 | 4 | 1 | 1 | 2 | 10 | 1.35 | 0.06 | 0.1 | | | 340 | 96.4 | 92.0 | 5.1 | 88.7 | 4.9 |

EXAMPLES 16–22

Catalysts of various compositions as shown in Table 4 were prepared similarly to Example 1.

Sixty (60) ml. of each catalyst were packed in a stainless steel U-shaped tube of 20 mm. in diameter, and through the tube immersed in molten nitrate bath of the temperature indicated in Table 4, a gaseous mixture composed of 4 vol. percent of isobutylene, 51 vol. percent of air, and 45 vol. percent of steam was passed to be reacted, with the contact time of 2.0 seconds. The results were as shown in Table 4.

TABLE 4

| Example No. | Co | Fe | Bi | W | Mo | Si | K | Na | Li | Cs | Reaction temperature (°C.) | Isobutylene conversion (mol percent) | Methacrolein selectivity (mol percent) | Methacrolein per-pass yield (mol percent) |
|---|---|---|---|---|---|---|---|---|---|---|---|---|---|---|
| 16 | 4 | 1 | 1 | 2 | 10 | 1.35 | 0.2 | | | | 340 | 92.0 | 82.1 | 75.5 |
| 17 | 4 | 1 | 1 | 2 | 10 | 1.35 | 0.06 | | | | 310 | 92.3 | 81.0 | 74.8 |
| 18 | 4 | 1 | 1 | 3 | 9 | 1.35 | | 0.1 | | | 300 | 93.5 | 84.9 | 79.3 |
| 19 | 4 | 1 | 1 | 3 | 9 | 1.35 | | 0.5 | | | 345 | 92.2 | 83.7 | 77.1 |
| 20 | 4 | 1 | 1 | 2 | 10 | 1.5 | | | 0.02 | | 315 | 93.3 | 83.1 | 77.5 |
| 21 | 4 | 1 | 1 | 2 | 10 | 1.5 | | | | 0.02 | 320 | 93.5 | 81.0 | 75.7 |
| 22 | 4 | 1 | 1 | 2 | 10 | 2.0 | 0.1 | 0.05 | | | 330 | 93.5 | 82.0 | 77.4 |

We claim:

1. A process for the preparation of an unsaturated carbonyl compound selected from acrolein and methacrolein which comprises catalytically oxidizing an olefin selected from the group consisting of propylene and isobutylene with molecular oxygen in the vapor phase, in the presence of a catalyst consisting essentially of the oxides of the metallic elements Co, Fe, Bi, W, Mo, Si and Z in which the atomic ratio among said metallic elements, Co:Fe:Bi:W:Mo:Si:Z is within the range of 2.0–20.0:1–10.0:0.1–10.0:0.5 – 10.0:2.0 – 11.5:0.5–15.0: 0.005–1.0, with the proviso that W plus Mo equals 12.0, and Z represents an alkali metal at contact times from 1.0 to 10.0 seconds, at temperatures ranging from 250° to 450° C. and pressures ranging from normal pressure to 10 atmospheres.

2. The process of claim 1 wherein the atomic ratio among said metallic elements Co:Fe:Bi:W:Mo:Si:Z is within the range of 3.0–6.0:0.5–2; 0.5–1; 2–4; 8–10; 1.35–3 0.02–0.1.

3. A process for the preparation of acrolein which comprises catalytically oxidizing propylene with molecular oxygen in the vapor phase, in the presence of a catalyst consisting essentially of the oxides of the metallic elements Co, Fe, Bi, W, Mo, Si and Z in which the atomic ratio among said metallic elements, Co:Fe:Bi:W:Mo: Si:Z is within the range of 2.0–20.0:0.1–10.0:0.1–10.0: 0.5–10.0:2.0–11.5:0.5–15.0:0.005–1.0, with the proviso that W plus Mo equals 12.0, and Z represents an alkali metal, at contact times of from 1.0 to 10.0 seconds, at temperatures ranging from 250° to 450° C. and pressures ranging from normal pressure to 10 atmospheres.

4. A process for the preparation of methacrolein which comprises catalytically oxidizing isobutylene with molecular oxygen in the vapor phase, in the presence of a catalyst consisting essentially of the oxides of the metallic elements Co, Fe, Bi, W, Mo, Si and Z in which the atomic ratio among said metallic elements, Co:Fe:Bi:W:Mo:Si:Z is within the range of 2.0–20.0:0.1–10.0:0.1–10.0:0.5–10.0:2.0–11.5:0.5–15.0:0.005–1.0, with the proviso that W plus Mo equals 12.0, and Z represents an alkali metal, at contact times of from 1.0 to 10.0 seconds, at temperatures ranging from 250° to 450° C. and pressures ranging from normal pressure to 10 atmospheres.

References Cited

UNITED STATES PATENTS

| | | | |
|---|---|---|---|
| 3,679,603 | 7/1972 | Garnish et al. | 252—456 |
| 3,089,909 | 5/1963 | Barclay et al. | 252—456 X |
| 3,642,930 | 2/1972 | Grasselli et al. | 260—604 R |
| 3,522,299 | 7/1970 | Takenaka et al. | 260—604 R |
| 3,236,782 | 2/1966 | Koch | 260—604 R |

FOREIGN PATENTS

| | | | |
|---|---|---|---|
| 1,558,233 | 1/1969 | France | 260—604 R |

HOWARD T. MARS, Primary Examiner

U.S. Cl. X.R.

252—456, 458, 459; 210—533 N

UNITED STATES PATENT OFFICE
CERTIFICATE OF CORRECTION

Patent No. 3,825,600          Dated July 23, 1974

Inventor(s) Takashi OHARA ET AL

It is certified that error appears in the above-identified patent and that said Letters Patent are hereby corrected as shown below:

In the Heading, insert the following:

-- Claims priority, application Japan, No. 45-44531/70,

May 26, 1970. --

Signed and sealed this 24th day of December 1974.

(SEAL)
Attest:

McCOY M. GIBSON JR.          C. MARSHALL DANN
Attesting Officer            Commissioner of Patents